May 29, 1928.

R. E. MARBURY 1,671,478

CONDENSER FOR GRID LEAKS

Filed Nov. 2, 1921

WITNESSES:

INVENTOR
Ralph E. Marbury
BY
ATTORNEY

Patented May 29, 1928.

1,671,478

UNITED STATES PATENT OFFICE.

RALPH E. MARBURY, OF WILKINSBURG, PENNSYLVANIA, ASSIGNOR TO WESTINGHOUSE ELECTRIC & MANUFACTURING COMPANY, A CORPORATION OF PENNSYLVANIA.

CONDENSER FOR GRID LEAKS.

Application filed November 2, 1921. Serial No. 512,224.

My invention relates to electrical condensers, more especially to condensers for grid leaks employed in wireless telegraphy and telephone transmission systems.

It is among the objects of my invention to provide a grid leak condenser which shall be self-contained and which shall constitute a complete unit.

It is a further object of this invention to provide a grid leak condenser which shall be of simple construction, economical to manufacture, be adapted to production in large quantities and be of uniform quality.

It is another object of this invention to provide grid leak condensers which shall be electrically efficient and which shall be mechanically strong to resist the wear and tear to which they are subjected in handling.

In my Patent No. 1,373,012, issued March 29, 1921, there is described a grid leak which is employed in radio circuits in combination with a condenser element which is usually connected to the grid leak member by suitable leads to provide a combined resistance and capacity reactance in the circuit.

In my present invention, I provide a condenser element in combination with a grid leak resistance member in a single structure, the condenser element being substituted for the usual glass tube or casing in which the resistance member is contained. The condenser element is so constructed as to form a cylindrical hollow tube of insulating or dielectric material having the conducting elements interposed between the sheets of dielectric material in staggered relation with the ends of the conducting elements projecting on opposite sides of the tubes. The insulating and conducting sheet materials are spirally wound under heat and pressure to consolidate the layers and form an integral mass.

In the accompanying drawings constituting a part hereof and in which like reference characters designate like parts, Figure 1 is a longitudinal sectional view of a grid leak condenser element embodying a resistance member having a condenser element wound therearound in accordance with my invention;

Figure 1:
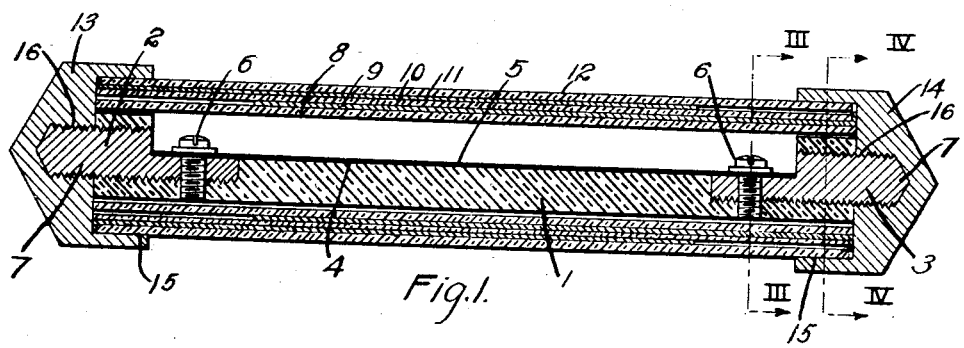
Figure 2:
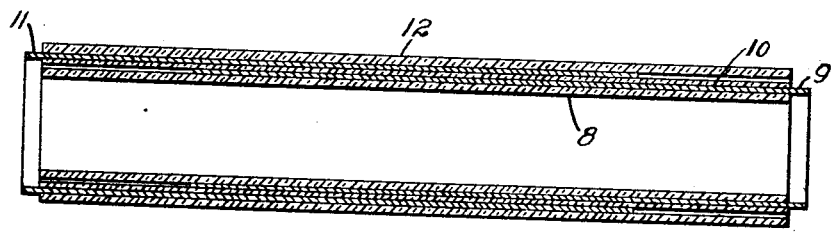
Fig. 2 is a longitudinal sectional view of the condenser element.
Figure 3:
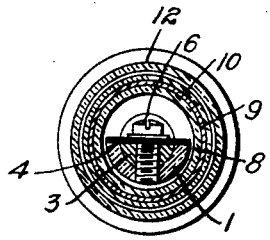
Fig. 3 is a cross-sectional view of the condenser element taken along the line III–III of Fig. 1.
Figure 4:
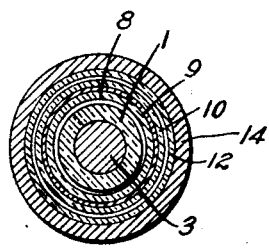
Fig. 4 is a cross-sectional view thereof taken along the line IV–IV of Fig. 1.

I provide an insulating rod or tube 1 having metal studs 2 and 3 screwed or molded in the ends thereof and having its central body portion partially cut away to form a flat surface 4 for mounting a suitable resistance material 5, which is secured to the member 1 and the studs 2 and 3 by screws 6. The studs 2 and 3 may be threaded either along their entire body portion or only at their projecting ends 7.

A condenser element, which is secured around the insulating rod 1, comprises a tube 8, having a concentric thin copper tube 9 disposed thereon, and a layer of dielectric sheet material 10 and another thin copper tube 11, in staggered relation with the tube 9, and a protective layer or tube 12 of fibrous sheet material. A pair of metal end cap terminals 13 and 14, having recesses 15 corresponding to the outside diameter of the tube 12, and having inner threaded portions 16 corresponding to the threads on the ends 7 of the stud members 2 and 3, are assembled thereon by screwing them on the stud members until they seat against the projecting ends of the copper tubes 9 and 11.

The condenser element is formed by winding a strip of fibrous sheet material, such as paper, impregnated or coated with a binder, such as a phenolic condensation product, around a rotatable mandrel having a heated pressure roll in contact therewith. A plurality of turns corresponding to the thickness of tube 8 desired is wound on in this manner and then a strip of conducting material 9, such as copper or tin foil, is placed upon the fibrous sheet material so as to lap over one edge thereof. The length of the conducting material is such as to provide a complete turn or tube on the wound tube 8 and after winding on another complete turn of paper 10 another strip of foil, with its end projecting on the opposite side of the paper strip is wound on to form a tube 11. Then additional turns of the treated paper are wound up until the tube 12 is of the thickness desired.

The heat and pressure exerted by the pressure roll in contact with the sheet material as it is wound causes a fusing and then hardening of the phenolic condensation product, thereby providing a bond between the spirally wound layers which forms a hard, integral structure having the conducting material disposed therein. The end cap terminals 13 and 14 form circuits with the resistance element 5 and the projecting portions of the conductor elements 9 and 11, thus joining the resistance and the capacity reactance elements in parallel with the end caps 13 and 14 functioning as terminals.

It will be readily seen from the above description of my invention that grid leak condensers formed in accordance therewith provide a simple, economical and inexpensive structure adapted particularly for use in radio receiving sets which consist of relatively small and compact apparatus allowing but very little room for auxiliary devices of the type heretofore employed.

Although I have described a specific embodiment of my invention, it will be obvious to those skilled in the art that various modifications may be made in the details of construction thereof without departing from the principles herein set forth. For instance, the condenser element may be formed of any suitable dielectric material and any binder may be substituted for the phenolic condensation product. The number of turns and the width of foil employed may be varied to obtain any capacity desired and the number of turns of fibrous sheet material utilized is dependent on the thickness of wall and the strength of tube required for the specific application at hand.

I claim as my invention:

In a combined tubular condenser and resistor, a longitudinally extending non-conductive support for said resistor, a threaded extension at each end of said support, a condenser about said support and comprising concentric conductive members and intervening insulation, alternate ones of said conductive members extending beyond the insulation toward the end of one of said threaded extensions, the others of said conductive members extending beyond the insulation toward the end of the other one of said threaded extensions and conductive caps threadedly engaging said extensions at the ends of said support, whereby turning said caps on said threaded extensions in the direction to cause the caps to approach the condenser will cause the respective caps to engage the portions of the conductive members which extend toward them, respectively, and establish electrical connection between each conductive member and the respective cap.

In testimony whereof, I have hereunto subscribed my name this 24th day of October, 1921.

RALPH E. MARBURY.